United States Patent
Huber et al.

(10) Patent No.: US 6,793,098 B2
(45) Date of Patent: Sep. 21, 2004

(54) SYSTEM AND APPARATUS FOR FOAM DISPENSING WITH ADJUSTABLE ORIFICE FLOW REGULATING DEVICE AND METHOD OF USING SAME

(75) Inventors: E. Richard Huber, Houston, TX (US); Pat L. Murray, Spring, TX (US); Robert L. Ferrante, Davie, FL (US); Pat Donahue, The Woodlands, TX (US)

(73) Assignee: Polyfoam Products, Inc., Tomball, TX (US)

( * ) Notice: Subject to any disclaimer, the term of this patent is extended or adjusted under 35 U.S.C. 154(b) by 94 days.

(21) Appl. No.: 10/241,450

(22) Filed: Sep. 11, 2002

(65) Prior Publication Data

US 2003/0150872 A1 Aug. 14, 2003

Related U.S. Application Data

(60) Provisional application No. 60/354,714, filed on Feb. 8, 2002.

(51) Int. Cl.$^7$ .............................................. B67D 5/52
(52) U.S. Cl. ........................ 222/1; 222/136; 222/145.5; 222/145.7; 222/399
(58) Field of Search ............................. 222/136, 145.5, 222/145.6, 145.7, 399, 1

(56) References Cited

U.S. PATENT DOCUMENTS

| | | | |
|---|---|---|---|
| 3,780,910 A | 12/1973 | Wagner | |
| 4,074,363 A | * 2/1978 | Croft | ........................ 366/138 |
| 4,471,887 A | 9/1984 | Decker | |
| 4,523,696 A | 6/1985 | Commette et al. | |
| 4,778,083 A | 10/1988 | Decker | |
| 4,867,346 A | 9/1989 | Faye et al. | |
| 5,004,125 A | 4/1991 | Standlick | |
| 5,027,975 A | * 7/1991 | Keske et al. | .................... 222/1 |
| 5,092,492 A | * 3/1992 | Centea | ........................ 222/137 |
| 5,180,082 A | 1/1993 | Cherfane | |
| 5,219,097 A | 6/1993 | Huber et al. | |
| 5,246,143 A | 9/1993 | Cherfane | |
| 5,265,761 A | 11/1993 | Brown | |
| 5,339,991 A | 8/1994 | Snyder | |
| 5,462,204 A | * 10/1995 | Finn | ............................ 222/137 |
| 5,611,462 A | * 3/1997 | Barkes | ........................ 222/134 |
| 5,727,713 A | 3/1998 | Kateman et al. | |
| 5,893,486 A | 4/1999 | Wasmire | |
| 6,047,861 A | 4/2000 | Vidal et al. | |
| 6,283,329 B1 | 9/2001 | Bezaire et al. | |
| 6,315,161 B1 | 11/2001 | Bezaire et al. | |

* cited by examiner

*Primary Examiner*—Joseph A. Kaufman
(74) *Attorney, Agent, or Firm*—Douglas W. Rommelmann; Andrews Kurth LLP

(57) ABSTRACT

A dispensing system for mixing at least first and second components and dispensing an expanding foam is disclosed. The system includes separate vessels, each containing a foam component, and a dispensing apparatus. The dispensing apparatus includes a cartridge assembly mounted on a body assembly. The cartridge assembly includes a mix chamber and first and second ports, each for supplying a foam component to the mix chamber. A pair of adjusting valves is mounted to the cartridge assembly with each valve operable to adjust the flow of each foam component to the mix chamber. A pair of hoses connects the vessels to the cartridge assembly. Each adjusting valve is a variable orifice device in the cartridge assembly having the capability of varying the flow area of the port. The present invention also includes a method for adjustably controlling, at the dispensing apparatus, the flow of each of the first and second components to the mixing chamber to alter their ratio therein. Additionally, the throughput of the dispensing apparatus can be controlled by the variable orifice devices.

22 Claims, 4 Drawing Sheets

SYSTEM AND APPARATUS FOR FOAM DISPENSING WITH ADJUSTABLE ORIFICE FLOW REGULATING DEVICE AND METHOD OF USING SAME

CROSS-REFERENCE TO RELATED APPLICATIONS

The present application claims priority from Provisional Application Serial No. 60/354,714, filed on Feb. 8, 2002, which is incorporated herein in its entirety by reference.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention relates generally to a system, apparatus and method for mixing and dispensing foams and, more particularly, to a system, apparatus and method for mixing and dispensing expanding foams employing an adjustable orifice flow regulating device for controlling the composition of the resulting foam.

2. Description of the Related Art

Various foam dispensing systems and apparatuses, including guns, have been proposed and used for mixing and dispensing synthetic foams, including such expanding synthetic foams as polyurethane or polyisocyanurate foams. Typically, preparation of an expanding synthetic foam requires the uniform mixing of two fluid components. For example, in a polyurethane foam, one component is a polyol component, referred to as the B component, and the other component is an isocyanate component, referred to as the A component. The A and B components may include one or more other agents, including, but not limited to, foaming agents, curing agents, catalysts or accelerators. The A and B components are conventionally stored in separate containers prior to use. Typically, the two components are combined in the mixing chamber of a dispensing apparatus or dispensing gun to create the expanding foam. When the two components are mixed in proper proportions, they typically react quickly to form and solidify into the expanding foam.

Current methods of regulating the ratio of these streams leverage the control of the viscosity of the chemicals and/or the pressure of each component stream. Controlling the viscosity of the chemical components typically requires the application of heat. Such a method of stream control is generally undesirable due to its cost. Controlling component streams with pressure has its own problems in that to change the pressure of the chemical components in a conventional system, the operator must take the gun back to the area where the chemical tanks and the pressure controls are located to make adjustments to the pressures and flow rates of the chemicals. In order to make these adjustments, each of the chemical vessels connected to the dispensing gun commonly employ separate pressure controls so that their respective pressures may be independently adjusted.

It is desirable to be able to regulate the ratio of the chemical component streams of a foam component mixing apparatus quickly and easily. It is also desirable to be able to regulate the ratio of the chemical components at the dispensing apparatus. It is also desirable to be able to vary the throughput of the dispensing apparatus at the apparatus.

SUMMARY OF THE INVENTION

The present invention includes a method, apparatus and system for mixing and dispensing chemical component streams of a foam component wherein regulating the ratio of the chemical component streams is quick and easy and controlled at the dispensing apparatus. Additionally, the present invention allows the operator to control the throughput at the dispensing apparatus.

The dispensing system for mixing first and second components and dispensing an expanding foam preferably includes separate vessels containing each foam component and a dispensing apparatus. The dispensing apparatus preferably includes a cartridge assembly mounted on a body assembly. The cartridge assembly further preferably includes a mix chamber and first and second ports, each port for supplying a foam component to the mix chamber. A pair of adjusting valves is also preferably mounted to the cartridge assembly with each adjusting valve operable to individually adjust the flow of each foam component to the mix chamber. A pair of hoses preferably connects the component vessels to the cartridge assembly. Each adjusting valve preferably includes a variable orifice device in the cartridge assembly operable to vary the flow area of the port. The present invention further includes a method for adjustably controlling, at the dispensing apparatus, the flow of each of the first and second foam components to the mixing chamber such that the ratio of the foam components therein may be easily altered and controlled.

BRIEF DESCRIPTION OF THE DRAWINGS

The objects, advantages, and features of the invention will become more apparent with reference to the drawings appended hereto and wherein like numerals indicate like parts and wherein an illustrated embodiment of the invention is shown, in which.

DETAILED DESCRIPTION OF THE INVENTION

Figure 1:
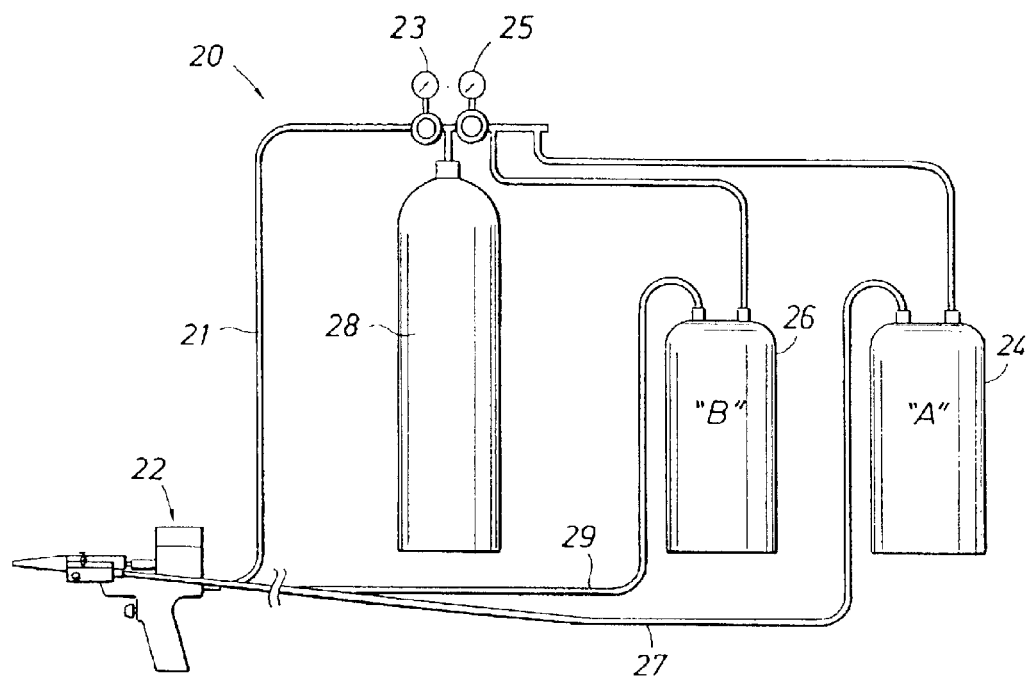
FIG. 1 is an elevation view of a foam dispensing system formed in accordance with teachings of the present invention.

The dispensing system of the present invention, designated generally as 20 in FIG. 1, is described below with reference to the drawings. The present invention is particularly well suited for mixing and dispensing expanding foams, such as polyurethane and polyisocyanate foams, and is generally described below in this context. However, the present invention has other applications that may be appreciated by those skilled in the art and, as such, it is to be understood that application of the present invention is not limited to expanding foams.

Referring to FIG. 1, one embodiment of an expanding foam dispensing system 20 is shown. The expanding foam dispensing system 20 preferably includes a foam dispensing apparatus or dispensing gun 22 operable to mix and dispense chemical reactants used in forming an expanding foam, such as a polyurethane or polyisocyanate foam. The foam dispensing system 20 also preferably includes vessels 24 and 26, each for separately storing the chemical reactants A and B, respectively, commonly used in forming the polyurethane foam. A source 28 is preferably connected to the vessels 24 and 26 and is generally employed for the transfer of the chemical reactants in the vessels 24 and 26 to the foam dispensing gun 22. As shown in FIG. 1, the source 28 may be a pressurized source, such as a tank of pressurized nitrogen, having a regulating valve 25 operably coupled thereto. An alternative source 28 may consist of a pump assembly (not expressly shown) operable to pump the foam components from the vessels 24 and 26 to the dispensing gun 22.

The chemical reactants or foam components for a polyurethane foam are typically a liquid polymer resin designated as component B and an isocyanate compound designated as component A. Components A and B are typically supplied to the dispensing gun 22 through suitable hoses or feed lines 27 and 29. In many foam dispensing systems, hoses or feed lines 27 and 29 may range from between one-hundred (100) to two-hundred (200) feet in length.

Still referring to FIG. 1, the foam dispensing system 20 may also include a supply hose 21 from the source 28 to the dispensing gun 22. In the embodiment shown in FIG. 1, the supply hose 21 preferably provides compressed air or nitrogen from the source 28 to operate an air piston-type foam dispensing gun 22. In an alternate embodiment, the air piston-type dispensing gun 22 may be powered by a compressed air source that is separate from the source 28. In yet another embodiment, the dispensing gun 22 of the present invention may be a mechanically-operated dispensing gun. In an embodiment of the present invention in which a mechanically-operated dispensing gun is used, there is generally not a need for the supply hose 21 coupling the source 28 to the dispensing gun 22. In addition, the chemical vessels 24 and 26 may themselves be pressurized such that it is not necessary to employ the pressurized source 28 in the system 20 or a compressed air source that is separate from the source 28. Both air piston-type dispensing guns and mechanically-operated dispensing guns are known in the art. Teachings of the present invention include an improvement to dispensing guns and are applicable to both air piston and mechanically-operated dispensing guns.

Figure 2:
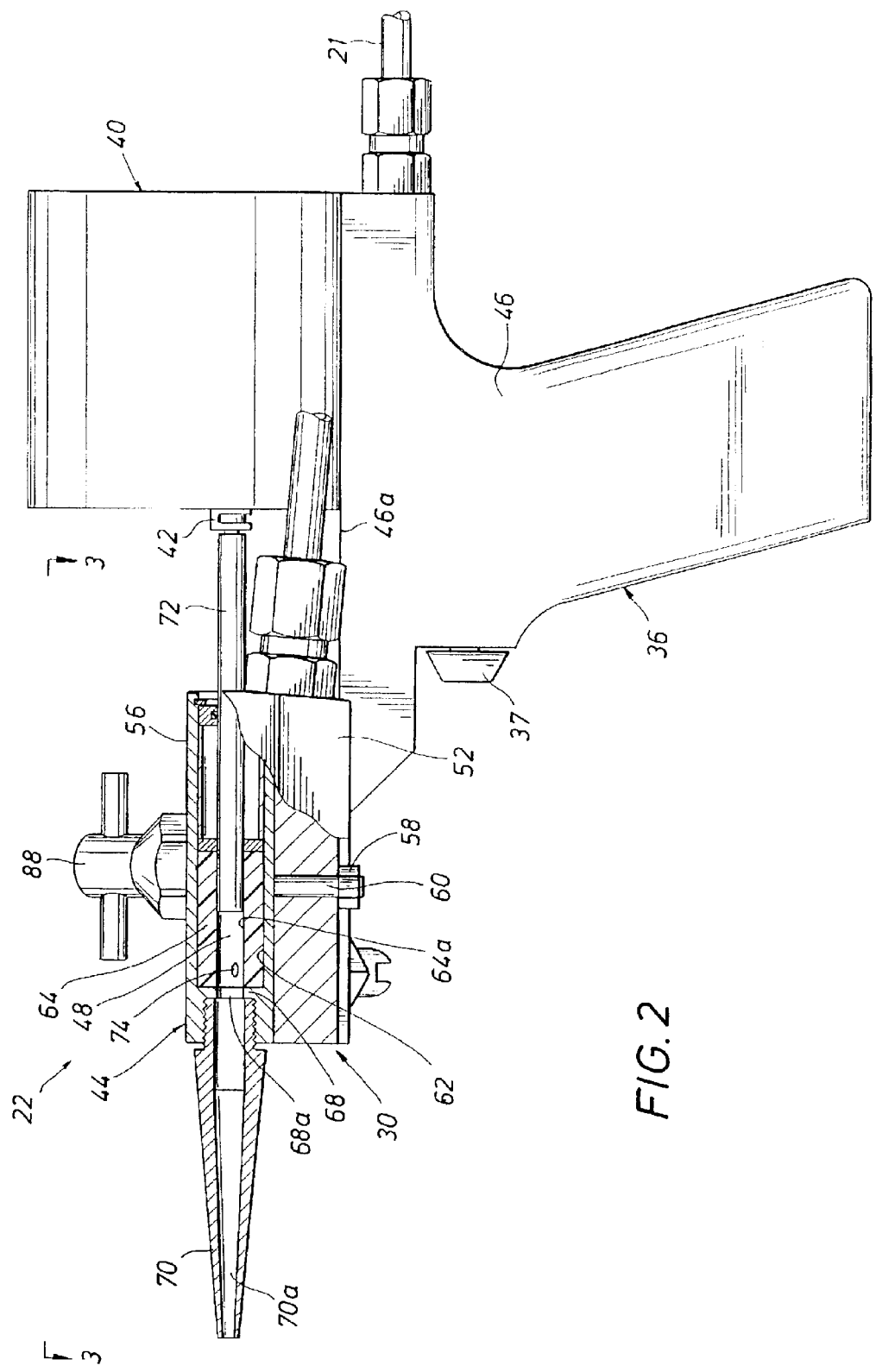
FIG. 2 is an elevation view, partially in section, of a dispensing apparatus formed in accordance with teachings of the present invention.

Referring now to FIG. 2, an enlarged view of an air piston-type dispensing gun 22 is shown. The air piston dispensing gun 22 generally includes several features described in assignee's U.S. Pat. No. 5,163,584. Applicant herein incorporates by reference U.S. Pat. No. 5,163,584 as to the components of the disclosure describing the common features of the dispensing gun 22.

Figure 3:
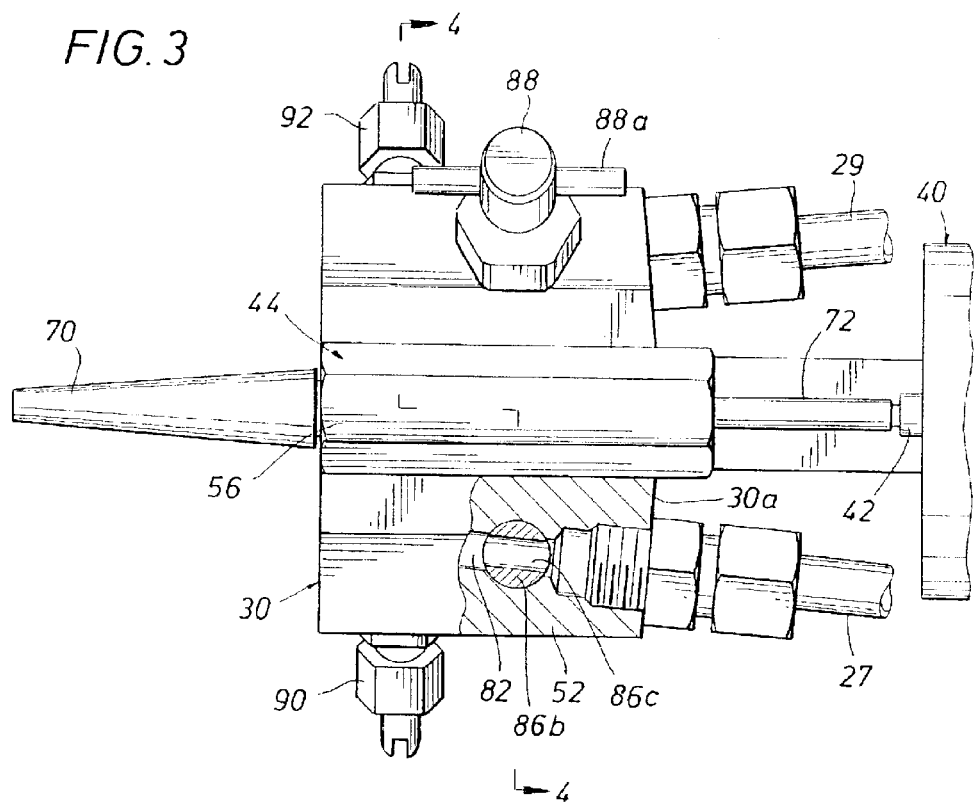
FIG. 3 is a view taken along lines 3—3 of FIG. 2.
Figure 6:
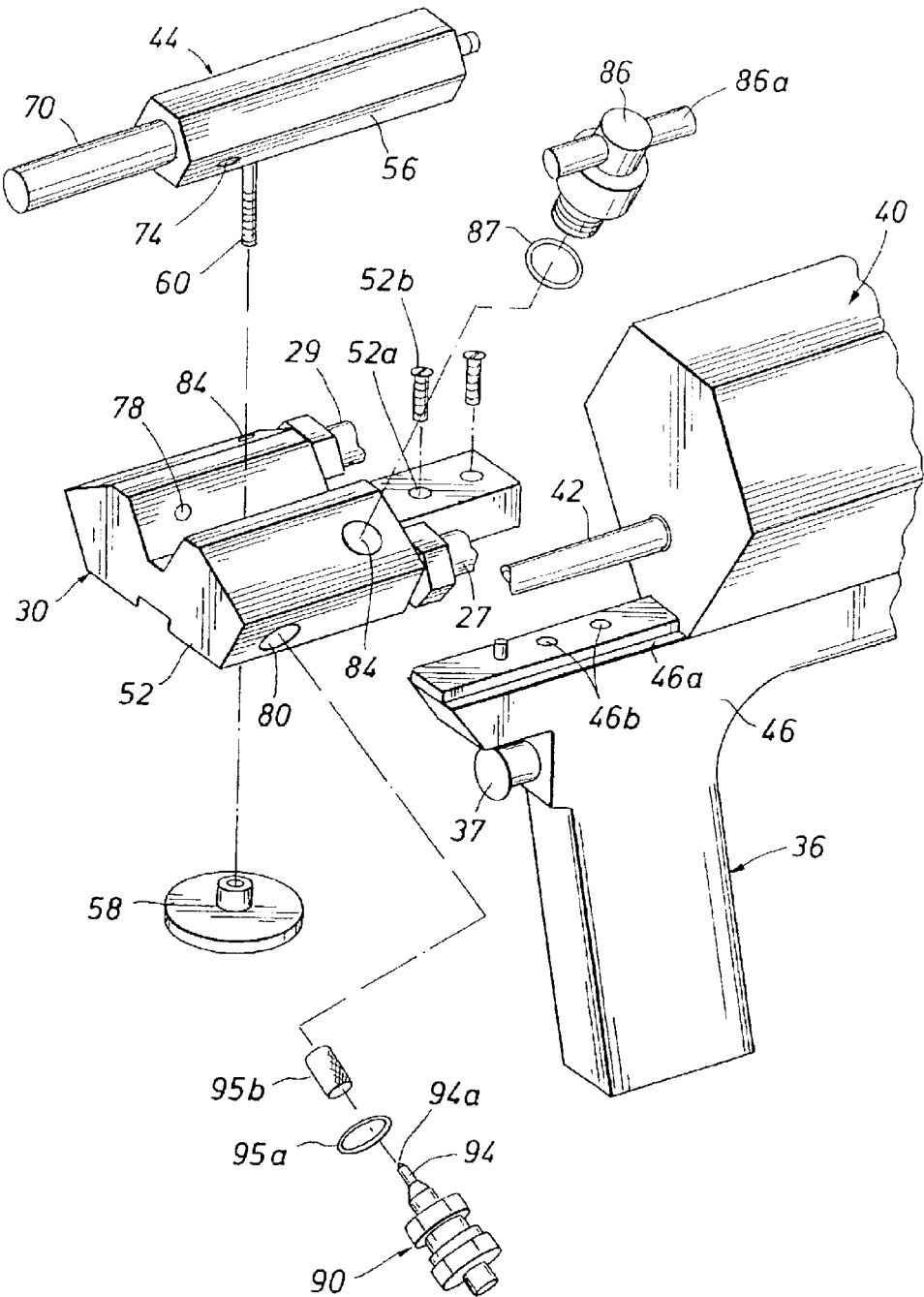
FIG. 6 is an exploded view of a portion of an embodiment of a dispensing apparatus formed in accordance with teachings of the present invention.

As shown in FIG. 1, the supply hose 21 preferably supplies compressed air or other pressurized gas from a source 28 to the dispensing gun 22 through a suitable regulating valve 23. The feed lines 27 and 29 supply foam components A and B to a carrier assembly 30 of the dispensing gun 22 as shown in FIG. 3. Referring to FIGS. 2 and 6, the dispensing gun 22 preferably also includes a handle assembly 36, an air cylinder assembly 40, and a cartridge assembly 44. The primary components of the dispensing gun 22 may be fabricated from any suitable wear resistant material which is chemically inert with respect to the components to be mixed. Suitable materials include, but are not limited to, aluminum, aluminum alloys, steel and copper alloys, and plastics such as acetal resin, epoxy, glass-filled epoxy, nylon and glass-filled nylon.

Referring to FIG. 2, the air cylinder assembly 40 may be secured to an upper end 46a of a handle body 46 of the handle assembly 36. Preferably, a carrier body 52 is releasably secured to the upper end 46a of the handle body 46. As shown in the embodiment of FIG. 6, the carrier body 52 may include one or more holes 52a therethrough aligning with corresponding holes 46b in the upper end 46a of the handle body 46. Preferably, threaded fasteners 52b extended through the holes 52a and engage the holes 46b to secure the carrier body 52 to the handle body 46. Further, a cartridge body 56 is preferably releasably secured to the carrier body 52, as, for example, with a threaded fastener 60 and an associated nut 58. The nut 58 is shown as a thumbnut in the embodiment of FIG. 6 for ease of installation and removal.

Although not expressly shown, the air cylinder assembly 40 preferably includes a sliding piston and cylinder. During operation, the piston is pneumatically driven by compressed air from the supply hose 21 in response to depression of a trigger 37 included on the handle assembly 36. Alternate means for operating the air cylinder assembly 40 may be appreciated by persons having skill in the relevant art and, as such, are contemplated within the scope of the present invention.

Figure 4:
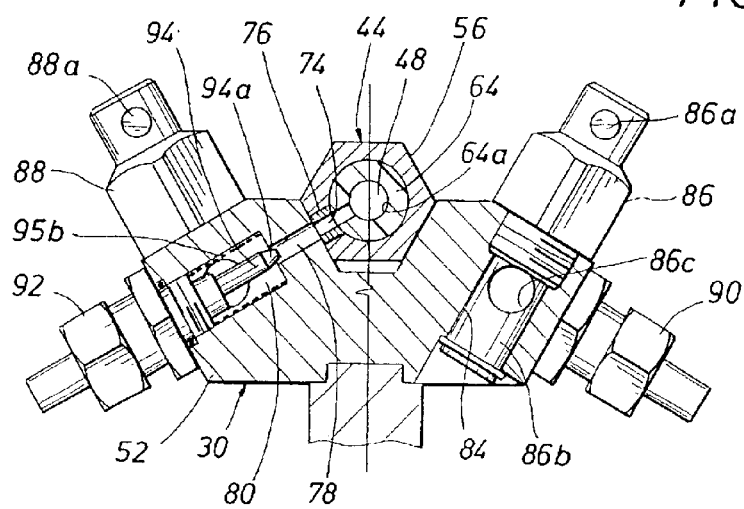
FIG. 4 is a view taken along lines 44 of FIG. 3.

The construction and details of an embodiment of the carrier assembly 30 and the cartridge assembly 44 are described in further detail with reference to FIGS. 2–6. It is to be understood that the present invention is not restricted to the illustrated carrier and cartridge assemblies 30 and 44, respectively, but the present invention contemplates a variety of configurations and shapes of these assemblies. The cartridge assembly 44 is generally constructed in the manner described in U.S. Pat. No. 5,163,584. The cartridge assembly 44 preferably includes the cartridge body 56 having a mixing or mix chamber 48 (FIGS. 2 and 4). The cartridge body 56 is preferably formed of stainless steel, metal, or other such suitable material which will not be chemically attacked by the polymer resin, polyisocyanate, or polyurethane foam. Further, the material chosen for the cartridge body 56 is preferably capable of withstanding any mechanical stresses typically imparted thereon.

As shown in FIG. 2, the cartridge body 56 preferably includes a longitudinal cavity 62 for receiving a core 64. The core 64 is preferably formed from or at least coated with Teflon or a similar, suitable material. The core 64 preferably also includes a longitudinal bore 64a extending therethrough. The core 64 is generally confined within the longitudinal cavity 62. An opening 68a is also preferably included and generally extends through a wall 68 in the cartridge body 56. Preferably, a nozzle 70 having a bore 70a is releasably coupled to the discharge end of the cartridge body 56.

Still referring to FIG. 2, a slide rod 72 longitudinally extends into the cartridge body 56 and is slidably received in an interference fit within the longitudinal bore 64a of the core 64. The slide rod 72 is preferably adapted to releasably connect to a piston rod 42 of the air cylinder assembly 40.

Referring now to FIG. 4, where portions of the dispensing gun 22 are shown cut away, the cartridge assembly 44 preferably includes a pair of apertures 74 extending radially therethrough and providing gas and/or fluid communication between the exterior of the cartridge body 56 and the longitudinal bore 64a of the core 64. It is to be understood that only one of the pair of apertures 74 is shown in FIG. 4 due to the way the section was taken (see FIG. 3). That is to say, the left portion of FIG. 4 reflects the right portion of FIG. 4 with the only difference being that the left portion generally depicts a cut-away view of various components. Accordingly, it is to be understood that a second aperture 74 extends radially down and to the right similar to the aperture 74 shown extending down and to the left in FIG. 4.

As shown in FIG. 4, an inlet member 76 may be inserted in the aperture 74 of the cartridge body 56. It is to be understood that the pair of apertures 74 generally provide for the entry of the A and B components into the longitudinal bore 64a of the core 64 or the mixing chamber 48. Enabling the A and B components the enter the mixing chamber 48 through the respective apertures 74 permits the expanding foam to be mixed and formed therein. As disclosed in U.S. Pat. No. 5,163,584, the apertures 74 are preferably arranged with respect to one another generally to enable the optimum mixing of the components.

Also as shown in FIG. 4, the cartridge body 56 is preferably arranged such that the apertures 74 may be positioned in communication with the fluid passageways 78 formed in the carrier body 52. As discussed above, it is to be understood that a fluid passageway 78 is present on both the left and right sides of the carrier body 52 although expressly shown on only the left side of FIG. 4.

Figure 5:
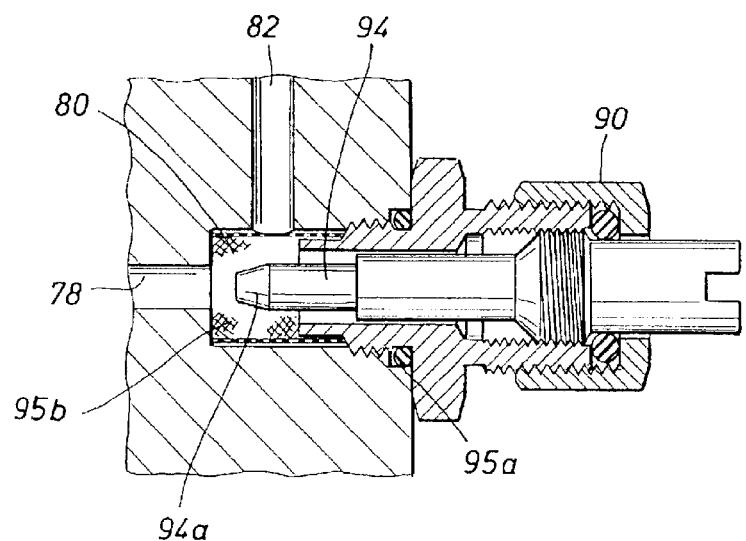
FIG. 5 is a partial view, in section, of an adjustable orifice valve formed in accordance with teachings of the present invention.

Referring to FIGS. 4 and 5, each fluid passageway 78 preferably communicates with an enlarged passageway 80. Each enlarged passageway 80 generally intersects with a substantially longitudinal passageway 82 (FIG. 3) extending to the rear 30a of the carrier assembly 30.

Referring again to FIG. 4, a pair of valve bores 84 (illustrated generally on the right side of FIG. 4) intersect with the longitudinal passageways 82. An on-off control valve 86 for the A component and an on-off control valve 88 for the B component are preferably inserted in the pair of valve bores 84. The valves 86 and 88 are preferably sealingly attached to the carried assembly 30. For example, FIG. 6 shows an O-ring 87 for providing a seal. On-off control valves 86 and 88 are preferably operable to permit or prevent the flow of foam components A and B, respectively, into the respective enlarged passageways 80. With reference to FIGS. 3 and 4, the valve 86 includes a handle 86a for rotating a shaft 86b having a port 86c therethrough. In the "on" position the port 86c aligns with the passageway 82 (FIG. 3), and in the "off" position the port 86c is generally transverse to the passageway 82 and the shaft 86b prevents the flow of the foam component. The valve 88 is similarly constructed and operated.

As shown in FIG. 3, hoses 27 and 29 are preferably threadedly connected to the longitudinal passageways 82 at the rear 30a of the carrier assembly 30. Thus, in the illustrated embodiment the A and B components are supplied to the mixing chamber 48 from the pressurized vessels 24 and 26 via the hoses 27 and 29 to the carrier assembly 30 through the on-off control valves 86 and 88 and then through the apertures 80 and 78 into the longitudinal bore 64a.

Referring now to FIGS. 3–5, a pair of adjustable orifice valves, preferably needle valves, 90 and 92 are preferably threadedly connected to each enlarged passageway 80 (FIG. 4) of the carrier body 52. Preferably, the adjustable orifice valves 90 and 92 include a needle 94 having a tapered nose 94a adapted to sealingly engage the fluid passageways 78 when in a closed position. FIG. 4 shows the adjustable orifice valve 92 in a substantially closed position. In the closed position, the foam component or fluid will generally not be able to pass through passageway 78 nor enter the mixing chamber 48. In FIG. 5, the adjustable orifice valve 90 is shown in a fully open position which generally allows full flow of a foam component through the passageway 78. It is to be understood that the adjustable orifice valves 90 and 92 enable the dispensing gun operator to make fine adjustments to the ratio of the A and B components of the dispensing gun 22 rather than at the source 28 or the foam component vessels 24 and 26, to achieve the desired results. In the embodiment of FIG. 6, a seal ring 95a and a filter screen 95b may be used for sealing and filtering of each of the foam components. As an alternate embodiment, a single adjustable orifice valve may be used to control one of the foam component streams, and thus control the ratio of that foam component stream relative to the second component stream.

Thus, the dispensing gun 22 of the present invention combines in the mix chamber 48 two separate foam component streams, such as liquid polyurethane chemical, which, when mixed together, react to form a polyurethane foam or elastomer. The preferred embodiment of the present invention preferably incorporates an adjustable orifice valve for each foam component stream which is conveniently located in the dispensing gun 22 to generally provide the following benefits:

1. The operator may make ratio adjustments without going back to the source of the chemicals or foam components. This capability eliminates the operator needing to take the dispensing gun back to the area in which the foam component vessels are located to make adjustments on the flow rate. Consequently, with the new adjustable orifice valves 90 and 92 of the present invention, the operator may adjust the foam component flow at the dispensing gun 22 itself, thereby eliminating the need to drag the dispensing gun 22 back to the area where the tanks 24 and 26 are located.

2. The adjustable orifice valves 90 and 92 of the present invention permit the operator to control and vary the throughput of the dispensing gun 22. A high throughput or output is obtained with the valves 90 and 92 fully open whereas a low output is obtained with the valves slightly open. Thus, when desired to adjust the rate of throughput, the operator can make the adjustment right at the dispensing gun 22.

3. The extra expense of pressure regulating equipment can be cut in half (only one pressure control device 25 is needed as shown in FIG. 1). In many conventional systems, each of the two foam component vessels connected to the dispensing gun typically have separate pressure controls such that their respective pressures may be independently varied. With the new adjustable orifice valves 90 and 92 of the present invention, both foam component vessels may be pressurized using a single pressure control device 25.

4. The variable size of the orifice valves 90 and 92 generally eliminates the need to have varied sizes of fixed ratio orifice mix chambers. The new adjustable orifice valves 90 and 92 of the present invention permit the dispensing gun operator to use one mix chamber with a high output flow rate, then reduce the flow rate with the adjustable orifice valves 90 and 92. The new adjustable orifice valves 90 and 92 of the present invention also permit the adjustment of foam component flow from the maximum allowable flow to negligible or zero flow.

5. The present invention may also be useful with currently available disposable kits which utilize a molded plastic dispenser gun having fixed orifices. The chemical tanks provided with these disposable kits are typically pre-pressurized and sealed. The pressure in these tanks generally cannot be adjusted by the operator. However, there are instances when the flow of the chemicals or foam components through the plastic gun may be altered by a partial blockage, or incorrect pressure on the sealed tank. By using a dispensing gun equipped with the adjustable orifice valves 90 and 92 of the present invention, the operator may adjust the chemical or foam component flow on either the A component or B component, despite the inability to alter the pressure on the tanks directly.

As should be apparent from the above discussion, the present invention is not limited to the embodiments described and disclosed in the figures. Instead, the present invention may be incorporated in numerous other types and configurations of dispensing apparatus and systems. The present invention provides many advantages over the conventional systems and dispensing apparatus.

The description given herein is intended to illustrate a preferred embodiment of the present invention. It is to be understood that the present invention should not be unduly limited to the foregoing embodiment which has been set forth for illustrative purposes. Various modifications and alterations of the invention will be apparent to those skilled in the art, and such modifications and alterations may be made without departing from the true scope of the invention. Therefore, it is intended that all such variations be included within the scope of the present invention as claimed herein.

We claim:

1. A method for mixing and dispensing foam components from a dispensing apparatus comprising the steps of:
    supplying a first foam component to the dispensing apparatus;
    supplying a second foam component to the dispensing apparatus;
    opening a first on-off control valve on the dispensing apparatus to allow entry of the first foam component in a first foam component passageway;
    adjusting, at the dispensing apparatus downstream of the first on-off control valve, a rate at which the first foam component flows into a mix chamber of the dispensing apparatus;
    mixing the first and second foam components in the mix chamber; and
    dispensing the mixed foam components from the mixing chamber.

2. The method of claim 1, further comprising the step of adjusting, at the dispensing apparatus, the rate at which both the first and second foam components flow into the mix chamber.

3. The method of claim 1, wherein the adjusting step further comprises repositioning a first adjustable orifice valve operably disposed between a passageway into the mix chamber and a passageway operable to supply the first foam component.

4. The method of claim 3, wherein the adjusting step further comprises repositioning a second adjustable orifice valve operably disposed between a passageway into the mix chamber and a passageway operable to supply the second foam component.

5. The method of claim 1, further comprising the step of opening a second on-off control valve on the dispensing apparatus to allow entry of the second foam component in a second foam component passageway.

6. The method of claim 5, further comprising the step of adjusting, at the dispensing apparatus downstream of the second on-off control valve, a rate at which the second foam component flows into the mix chamber of the dispensing apparatus.

7. A foam dispensing apparatus for mixing a plurality of foam components used in the formation of an expanding foam and dispensing the mixed foam components, comprising:
    a body assembly;
    a cartridge assembly mounted on the body assembly, the cartridge assembly including a mix chamber;
    means for supplying at least a first and a second foam component to the mix chamber;
    a first on-off control valve operably disposed between the mix chamber and the means for supplying the first and second foam components; and
    a first valve operably coupled to the cartridge assembly downstream of the first on-off control valve, the first valve operable to adjust a flow rate of the first foam component into the mix chamber.

8. The foam dispensing apparatus of claim 7, further comprising a second valve operably coupled to the cartridge assembly, the second valve operable to adjust a flow rate of the second foam component into the mix chamber.

9. The foam dispensing apparatus of claim 8, further comprising the first and second valves including a needle operable to sealingly engage respective fluid passageways disposed between the mix chamber and the means for supplying the first and second foam components.

10. The foam dispensing apparatus of claim 8, wherein the first and second valves are threadedly coupled to the cartridge assembly.

11. The foam dispensing apparatus of claim 8, further comprising first and second fluid passageways aligned on opposing sides of the mix chamber such that the first and second foam components are optimally mixed therein.

12. The foam dispensing apparatus of claim 8, further comprising a second on-off control valve operably disposed between the mix chamber and the means for supplying the second foam component.

13. The foam dispensing apparatus of claim 12, wherein the first and second on-off control valves are operably coupled to the cartridge assembly.

14. A dispensing system for mixing and dispensing an expanding foam, comprising:
    a first vessel containing a first foam component;
    a second vessel containing a second foam component;
    a dispensing apparatus having a cartridge assembly including a mix chamber with first and second fluid passageways;
    a first hose connecting the first vessel to the first fluid passageway, the first fluid passageway having a flow area;
    a second hose connecting the second vessel to the second fluid passageway, the second fluid passageway having a flow area;
    a first variable orifice device disposed on the cartridge assembly, the first variable orifice device operable to vary the flow area of the first fluid passageway;
    a first on-off control valve disposed upstream of the first variable orifice device; and
    a second variable orifice device disposed on the cartridge assembly, the second variable orifice device operable to vary the flow area of the second fluid passageway.

15. The dispensing system of claim 14, further comprising:
    the first and second variable orifice devices including a needle disposed thereon; and
    wherein the flow area of the respective fluid passageways may be is varied by repositioning the needle proximate thereto.

16. The dispensing system of claim 15, wherein the respective needles are operable to sealingly engage the respective fluid passageways.

17. The dispensing system of claim 16, wherein the respective needles have a tapered end operable to engage the respective fluid passageways.

18. The dispensing system of claim 14, wherein the first and second fluid passageways are disposed proximate one another and on opposing sides of the mix chamber such that the first and second foam components may be are optimally mixed upon entry therein.

19. The dispensing system of claim 14, further comprising:
   a third vessel operably coupled to the first and second vessels,
   wherein the third vessel is operable to pressurize the first and second vessels such that the first and second foam components are distributed to the dispensing apparatus.

20. The dispensing system of claim 19, further comprising:
   an air cylinder assembly operably coupled to the cartridge assembly and the mix chamber; and
   a third hose connecting the third vessel to a port disposed on the cartridge assembly, the port operably coupled to the air cylinder assembly,
   wherein the third hose is operable to provide pressure to the air cylinder assembly such that mixed foam components are discharged from the dispensing apparatus.

21. The dispensing system of claim 14, wherein the first and second vessels are pre-pressurized.

22. A dispensing system for mixing and dispensing an expanding foam, comprising:

a first vessel containing a first foam component;

a second vessel containing a second foam component;

a dispensing apparatus having a cartridge assembly including a mix chamber with first and second fluid passageways;

a first hose connecting the first vessel to the first fluid passageway the first fluid passageway having a flow area;

a second hose connecting the second vessel to the second fluid passageway, the second fluid passageway having a flow area;

a first variable orifice device disposed on the cartridge assembly the first variable orifice device operable to vary the flow area of the first fluid passageway;

a second variable orifice device disposed on the cartridge assembly, the second variable orifice device operable to vary the flow area of the second fluid passageway;

a first on-off control valve operably coupled between the first hose and the first fluid passageway, the first on-off control valve operable to restrict flow of the first foam component from the first hose to the first variable orifice device; and a second on-off control valve operably coupled between the second hose and the second fluid passageway, the second on-off control valve operable to restrict flow of the second foam component from the second hose to the second variable orifice device.

* * * * *